July 17, 1956  R. A. PROUD  2,754,908
MACHINE FOR CUTTING SLIDE FASTENER STRIPS
Filed May 25, 1951  7 Sheets-Sheet 1

Fig. 1.

INVENTOR.
RALPH A. PROUD
BY
R. E. Meech
ATTORNEY

July 17, 1956  R. A. PROUD  2,754,908
MACHINE FOR CUTTING SLIDE FASTENER STRIPS
Filed May 25, 1951  7 Sheets-Sheet 2

INVENTOR.
RALPH A. PROUD
BY
R. E. Meech
ATTORNEY

July 17, 1956 R. A. PROUD 2,754,908
MACHINE FOR CUTTING SLIDE FASTENER STRIPS
Filed May 25, 1951 7 Sheets-Sheet 6

Fig. 9.

INVENTOR.
RALPH A. PROUD
BY
R. E. Meech
ATTORNEY

July 17, 1956 R. A. PROUD 2,754,908
MACHINE FOR CUTTING SLIDE FASTENER STRIPS
Filed May 25, 1951 7 Sheets-Sheet 7

Fig. 10.

INVENTOR.
RALPH A. PROUD
BY
R. E. Meech
ATTORNEY ved July 17, 1956

2,754,908
MACHINE FOR CUTTING SLIDE FASTENER STRIPS

Ralph A. Proud, Wickliffe, Ohio

Application May 25, 1951, Serial No. 228,322

25 Claims. (Cl. 164—49)

This invention relates to slide fastener manufacture, and more particularly to an improved machine for cutting a continuous strip of slide fastener chain into individual fastener lengths.

In the manufacture of slide fasteners, it is customary to make long lengths of so-called "stringers" consisting usually of a beaded edge tape having groups of fastener elements attached to the beaded edge. The groups are of various lengths depending upon the length of the completed fastener desired. Between the groups, there is a blank or gap space along the edge of the tape where no elements are attached which provides, after the individual groups are cut apart, free tape ends necessary for a well-known purpose. In order to complete the fastener, it is usually the procedure to then connect or interengage the corresponding groups of two like stringers so as to provide so-called "continuous strip" or "chain," and cut into individual fastener lengths between the groups at the blank or gap space, and then complete the cut lengths into finished fasteners. It is to a machine for cutting the continuous strip into individual lengths that the present invention relates.

Accordingly, it is the general object of this invention to provide an improved machine which automatically cuts apart the tapes of the fastener stringers of a continuous fastener strip into individual fastener lengths accurately between the groups of fastener elements.

It is another object of the invention to provide an improved machine for cutting continuous fastener strip into individual lengths which is simple and inexpensive in its construction and, at the same time, efficient and effective in its use.

It is a further object of the present invention to provide such a machine having means incorporated therewith for delivering and conveying the cut fastener lengths quickly out of the machine.

Various other objects and advantages of this invention will be more apparent in the course of the following specification, and will be particularly pointed out in the appended claims.

In the accompanying drawings, there is shown for the purpose of illustration, an embodiment which the invention may assume in practice.

In these drawings.

Referring more particularly to the drawings, the machine illustrated consists generally of a frame 2 having suitable legs 3 and a top or bed 4. On top of the bed at the forward end thereof, there is mounted a bracket 5 having a lower guide plate 6 carried thereby in which there is arranged a longitudinally extending guideway 7 for guiding the strip to be cut. There is also carried by the bracket 5 directly below an opening in the guide plate 6, a cutting anvil 8.

Figure 3:
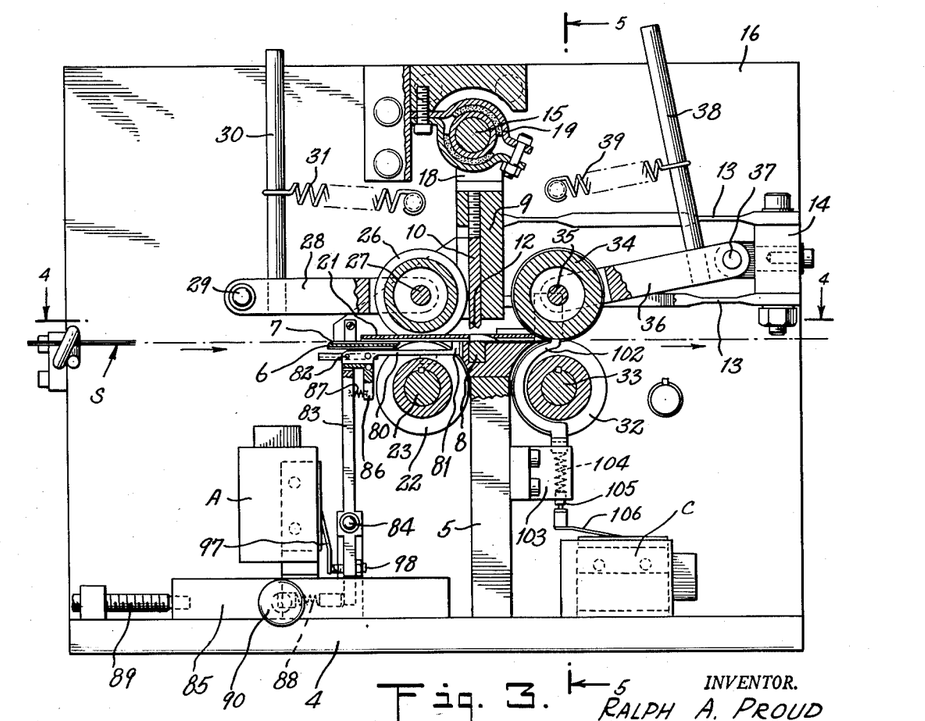
Fig. 3 is a sectional view taken on line 3—3 of Fig. 2.
Figure 4:
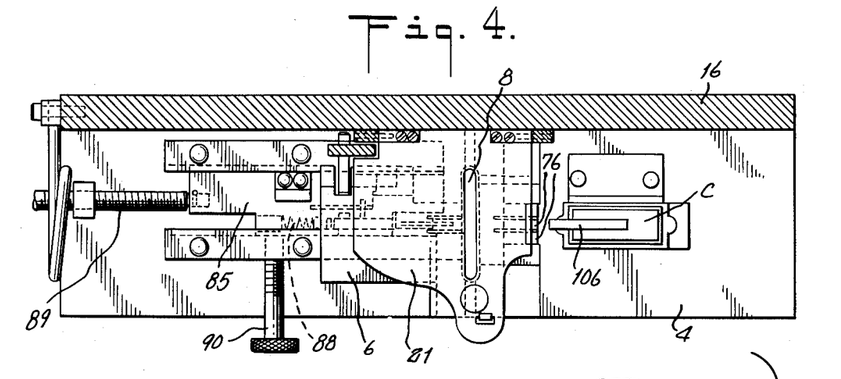
Fig. 4 is a sectional view taken on line 4—4 of Fig. 3.
Figure 5:
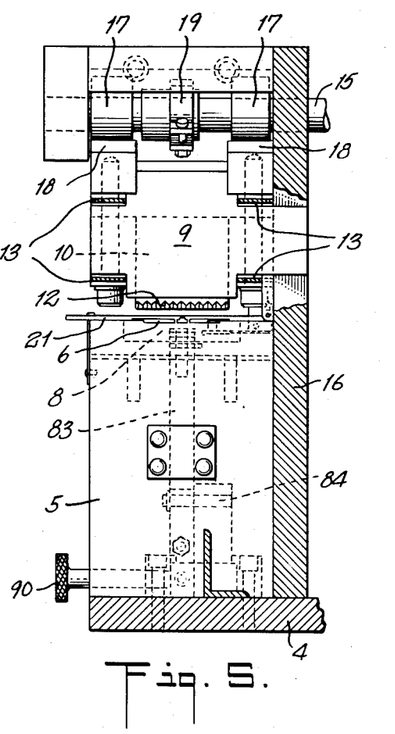
Fig. 5 is a sectional view taken on line 5—5 of Fig. 3.

As more clearly shown in Figs. 3, 4, and 5 of the drawings, directly above the anvil 8 and the plate 6, there is arranged for reciprocable movement a head 9 in which there is suitably mounted a cutting knife 10 which preferably has a serrated cutting edge, as at 12. This knife cooperates with the anvil 8 to cut the tapes of the strip in a manner to be described. The head 9 is mounted on the outer end of a plurality of flex plates 13, four in the present instance. The opposite ends of these flex plates are rigidly secured to an outwardly extending bracket member 14 mounted on the side of a vertically disposed plate-like member 16 which is mounted on the bed of the machine. It will be noted that there are no guides for the head 9, except the flex plates 13, and that it is supported solely thereby which is an important aspect of the present invention.

Above the head 9, there is mounted a shaft 15 which is journaled in suitable bearings arranged in opposed vertically arranged plates 16 and 16a mounted on the bed of the machine. There is carried by the shaft 15, a pair of cams 17 which cooperate with a pair of cam followers 18 arranged on the upper end of the head 9 to actuate the same together with the knife carried thereby. There is arranged with this shaft 15, preferably a friction or drag brake 19 for stopping the rotation of the shaft immediately after a single revolution thereof. There is also arranged with the shaft 15, a single revolution friction clutch 20 which is driven and actuated in a manner to be later described.

To one side of the head 9, there is arranged a movable upper guide plate 21 which cooperates with the lower guide plate 6 to guide the fastener strip into and through the machine. Below the guide plates 6 and 21 and forwardly of the head 9, there is arranged a driven centrally grooved feed roll 22 mounted on a drive shaft 23 which is rotatably mounted in suitable bearings in the plates 16 and 16a. With this shaft 23, there is arranged a slip clutch 24 and a friction brake 25 for arresting the rotation of the shaft during the cutting operation. Above the plates 6 and 21, there is arranged directly opposite the roll 22, a centrally grooved idler roll 26 which cooperates therewith to feed the strip into the machine. This idler roll is rotatably mounted preferably on a stud shaft 27 arranged on the outer end of a movable bracket member 28 which is pivotally attached, as at 29, to the plate 16. Adjacent the inner end of the bracket member 28, there is arranged an upwardly extending handle member 30. There is provided a tension spring 31 having one end attached to the handle member 30 and the other end attached to the plate 16 for maintaining normally the idler roll 26 in tangential contact with the roll 22 and between which rolls the strip passes.

On the opposite or forward side of the head 9 and below the lower plate 6, there is arranged another driven centrally grooved roll 32 for delivering the cut strips from the machine. This roll is mounted on a shaft 33 which in turn is also rotatably mounted in suitable bearings in the plates 16 and 16a. Directly above this roll 32, there is arranged another centrally grooved idler roll 34 rotatably mounted on a stud shaft 35 arranged on the outer end of a movable bracket member 36. The opposite end of the bracket member 36 is pivotally attached, as at 37, to the bracket 14. Adjacent the inner end of this bracket member 36, there is carried thereby an upwardly extending handle member 38 with which there is arranged a tension spring 39 for maintaining normally this idler roll 34 in tangential contact with the roll 32 with the cut strips passing therebetween.

Beyond the rolls 32 and 34 and forwardly of the machine and above the bed 4 thereof, there is arranged a longitudinally extending conveyor belt 40 disposed around a pair of rolls 41 and 42 for conveying the cut strips out of the machine. The roll 41 is a driven roll and is mounted on a drive shaft 43 suitably journaled in the plates 16 and 16a. The roll 42 is an idler roll and is rotatably mounted on a stud shaft carried preferably by an adjustable bracket 44 mounted on the extreme forward end of the bed 4 of the machine. To one side of the conveyor belt 40, there is provided preferably a tray 45 suitably attached to the machine for receiving the cut strips as they are brushed from the conveyor in a manner to be explained.

Above the conveyor belt 40, there are arranged a series of rotatable brushes 46 for sweeping the cut strips from the conveyor into the receiving tray 45. These brushes 46 are secured to a rotatable shaft 47 which is journaled in suitable bearings carried by the frame of the machine. With the shaft 47, there is arranged preferably a single revolution clutch 48 which is driven in a manner to be described.

Figure 1:
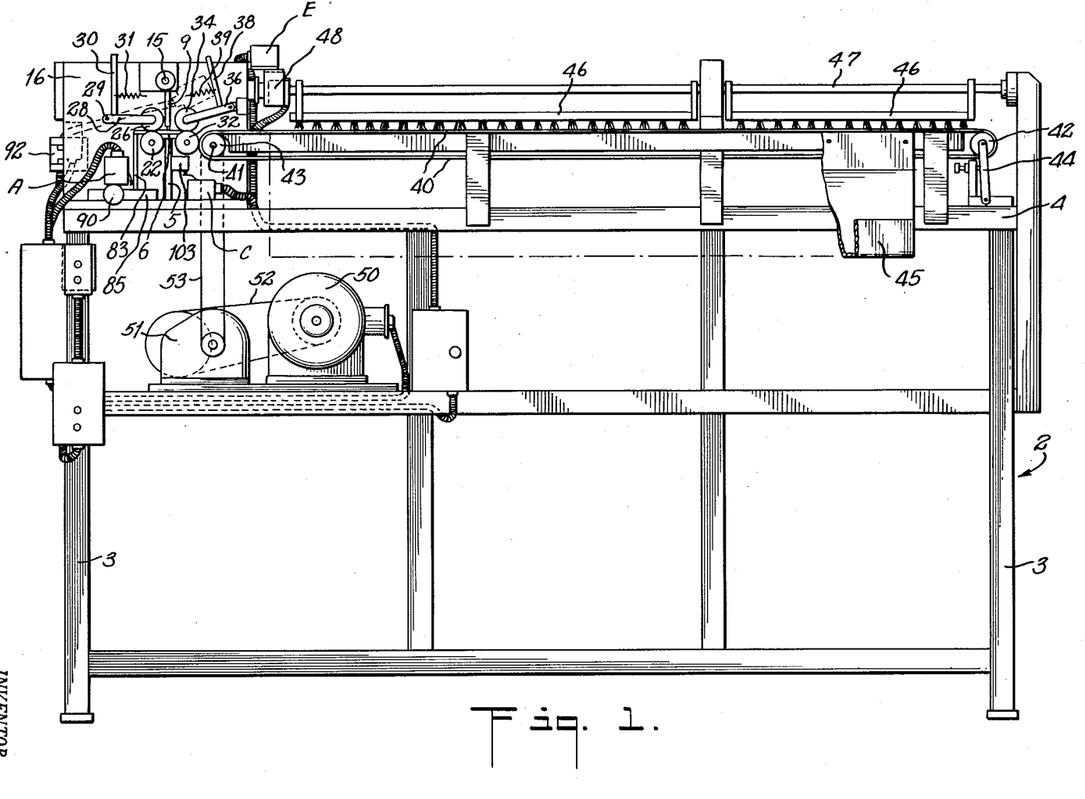
Fig. 1 is a front elevational view of the improved machine of the present invention.
Figure 2:
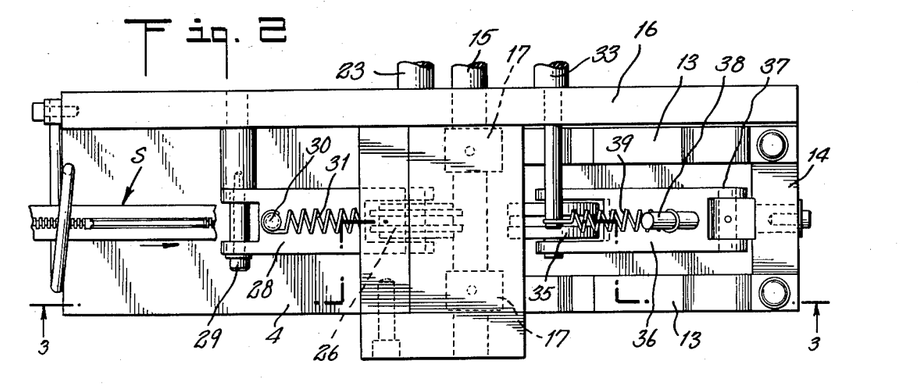
Fig. 2 is a plan view, partly in section, of the front part of the machine with the driving parts and conveyor belt removed.

As more clearly shown in Figs. 7, 8, and 9, the mechanism for driving the various parts of the machine is positioned between the plates 16 and 16a and will now be described. The main drive shaft 43 is driven by a suitable electric motor 50 mounted on the frame of the machine, as shown in Fig. 1, through a reducer 51 and belt 52 and chain 53. There is secured to the shaft 43, a beveled gear 55 which meshes with a beveled gear 56 arranged on one end of a short shaft 56a suitably journaled in a vertically disposed end plate-like member 57 extending between the plates 16 and 16a. On the opposite end of the shaft 43, there is arranged a sprocket 58, and there is provided a chain 59 which is disposed around the sprocket 58 and another sprocket 60 securely arranged on the shaft 47 for driving the same. On the outer side of the plate 57, there is adjustably arranged a bracket member 61 on which there is rotatably mounted a sprocket 62 which meshes with the chain 59 for adjusting the tension thereof.

There is also secured to the shaft 43, a sprocket 63 over and around which there is disposed a chain 64 which also is disposed over and around a sprocket 65 secured to the shaft 23 and over and around a sprocket 66 secured to the shaft 15. On the shaft 23, there is securely mounted a sprocket 67 over and around which there is disposed a chain 68 which also is disposed over and around a sprocket 69 securely arranged on the shaft 33. There is arranged with the shaft 33, a slip clutch 70.

The control mechanism for actuating various parts of the machine will now be described. As more clearly shown in Figs. 1, 3, and 10 of the drawings, there is arranged centrally of the feed roll 22 in a slot therein a movable member 80 having a finger end portion 81 which extends upwardly into the guideway 7 in the path of the fastener elements of the strip to be cut at a point adjacent the head 9. The outer end of the member 80 is pivotally attached, as at 82, to the upper end of a vertically disposed movable lever member 83 which has its lower end pivotally attached, as at 84, to an adjustable bracket member 85 disposed in suitable guides on the bed of the machine. There is arranged with the member 80, a downwardly extending projection 86, and between this projection and the member 83 there is positioned a compression spring 87 for maintaining normally the finger 81 in the guideway 7. At the lower end of the member 83, there is arranged in the bracket 85, another spring 88 for maintaining normally the member 83 together with the finger 81 in its rearwardmost position for a purpose to be explained. The bracket 85 is adjustable along the bed of the machine by means of the screw 89 and a locking screw 90 is provided for locking the bracket in its adjusted position.

Figure 7:
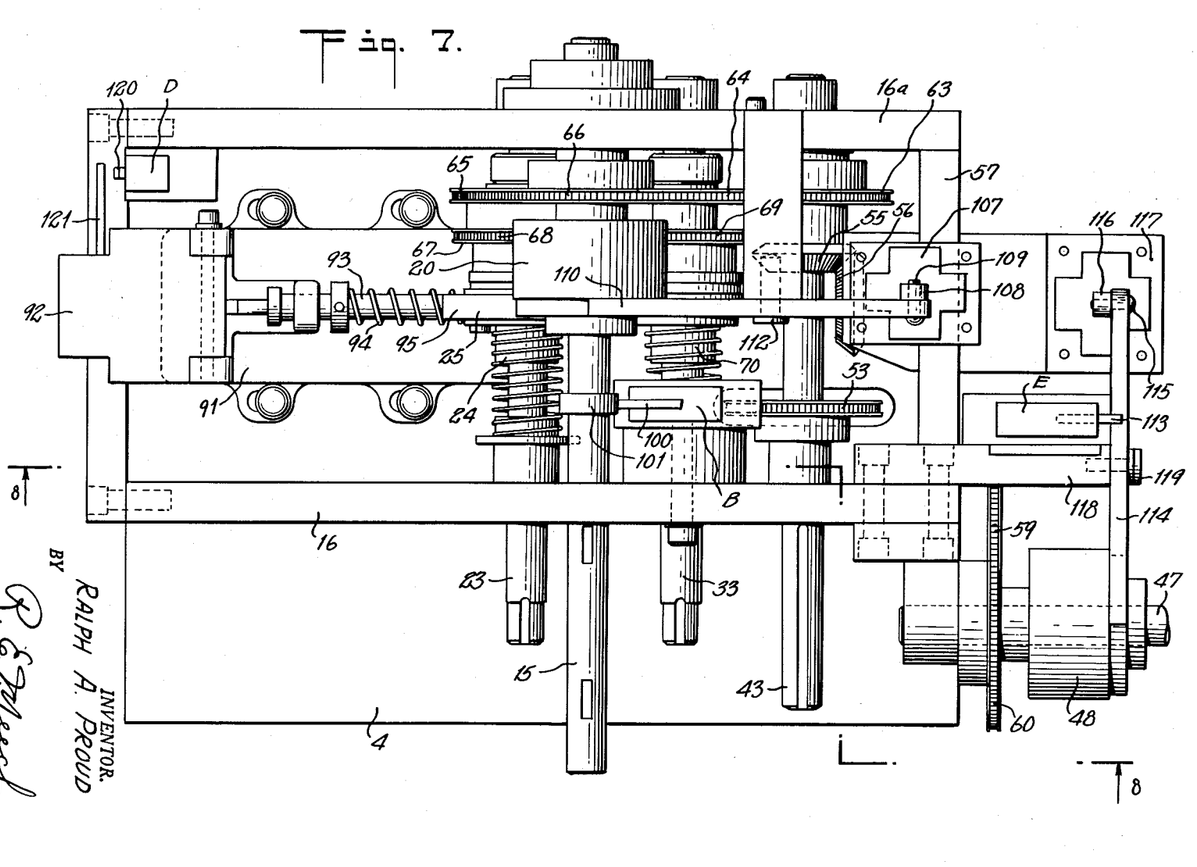
Fig. 7 is a plan view of the front part of the machine directly next to that part shown in Fig. 2, showing the driving mechanism.
Figure 8:
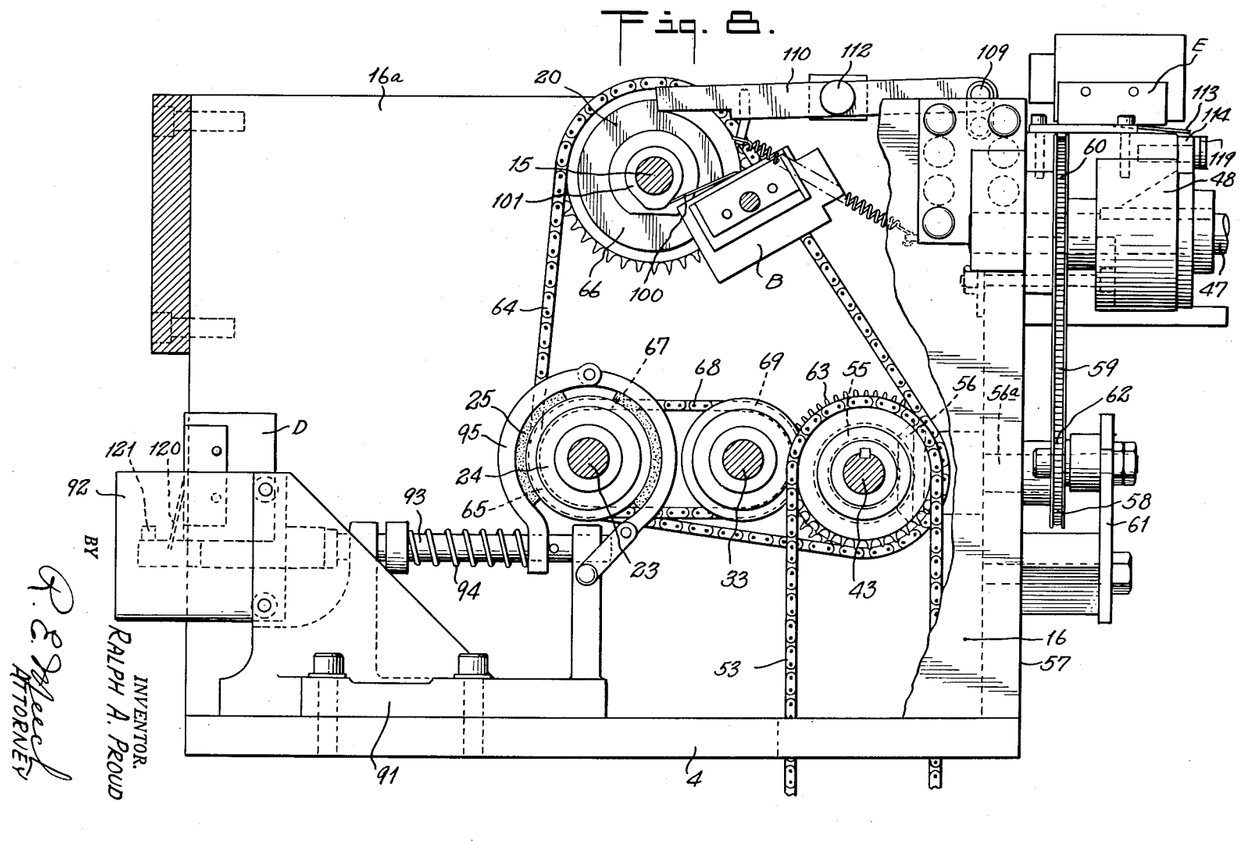
Fig. 8 is a sectional view taken on line 8—8 of Fig. 7.
Figure 9:
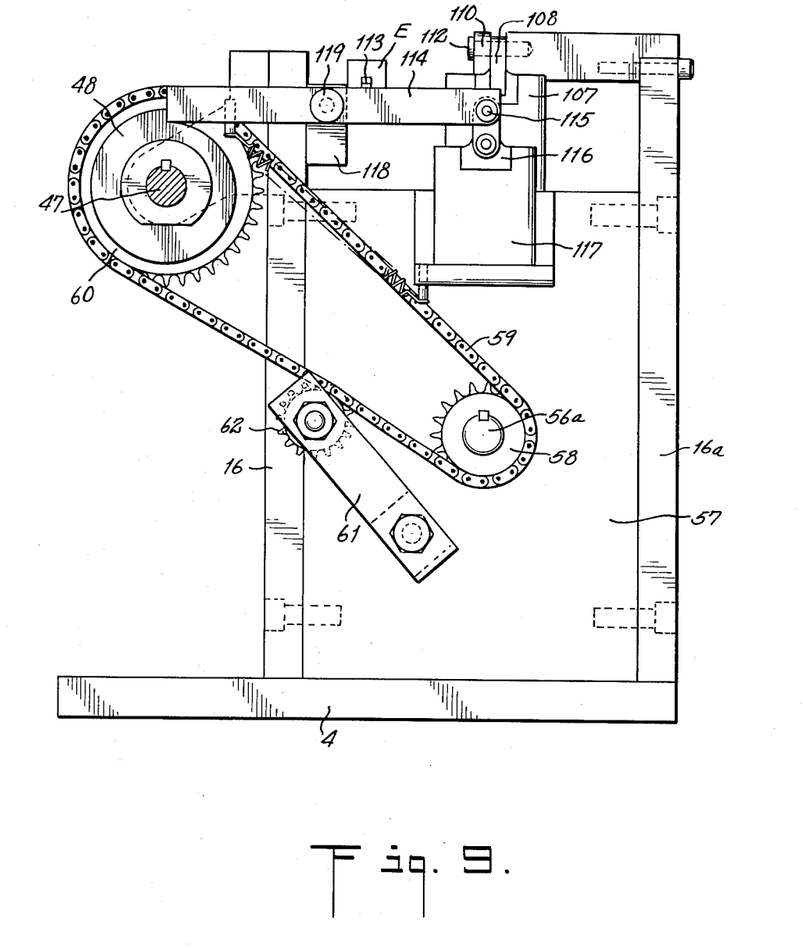
Fig. 9 is an end view of that part of the machine shown in Fig. 7, showing the driving mechanism for the sweep-off brush.
Figure 10:
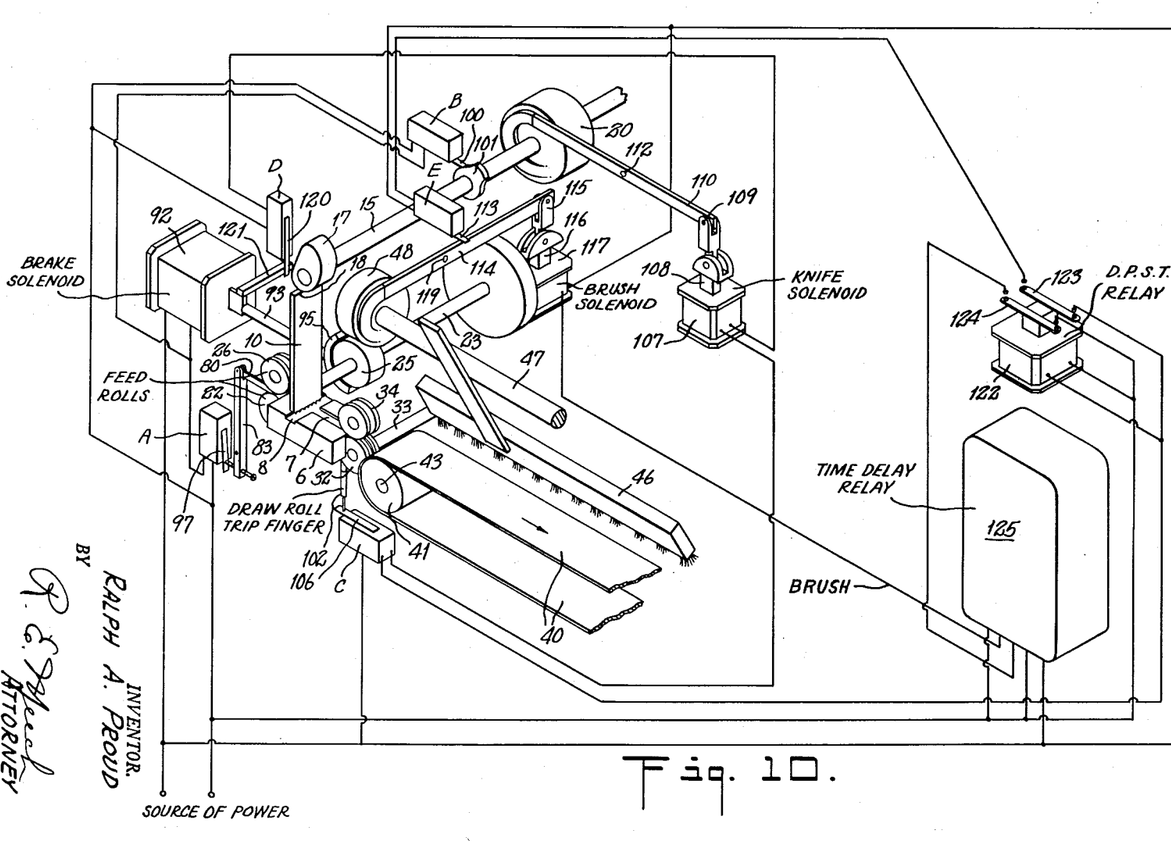
Fig. 10 is a schematic view of various parts of the machine together with wiring diagram.

On a bracket 91 mounted on the bed of the machine, as shown in Figs. 7 and 8, there is arranged a solenoid 92 having a plunger 93 around which there is disposed a spring 94 for returning the plunger to its normal position after energization of the solenoid. The outer end of the plunger 93 is attached to the brake band 95 of the brake 25 of the shaft 23. Adjacent the vertically disposed member 83, there is arranged on the bracket 85, a micro-switch A having a contact arm 97 arranged directly opposite the end of an adjustable screw 98 carried by the lever member 83 with which it cooperates, as shown in Figs. 3 and 10. This micro-switch is in the same circuit with the solenoid 92 and is adapted to control the energization thereof. Adjacent the shaft 15, there is arranged another micro-switch B having a contact arm 100 which is arranged directly opposite a cam member 101 arranged on shaft 15 with which cam this contact arm cooperates. This micro-switch B is also arranged in the same circuit with the solenoid 92.

Adjacent the roll 32 and in a slot arranged therearound, there is arranged a semi-circular shaped movable finger 102 which is reciprocably mounted in a bracket 103 positioned on the side of the bracket 5, as shown in Fig. 5. The upper end of this finger extends normally into the guideway 7 and is maintained in such position by means of a spring 104 arranged in bracket 103. At the lower end of the spring 104, there is arranged in the bracket 103, a plunger 105 which cooperates with a contact arm 106 of a double pole micro-switch C arranged on the bed 4 of the machine. In the same circuit with this micro-switch C, there is arranged a solenoid 107 which is mounted on the plate 57. This solenoid has a plunger 108 the outer end of which is pivotally attached, as at 109, to the outer end of a clutch pawl 110 of the clutch 20 on the shaft 15. This clutch pawl is pivoted intermediate its length, as at 112.

In the same circuit with the micro-switch C and the solenoid 107, there is arranged another micro-switch D which is mounted on the rear plate 16a adjacent the brake solenoid 92. This micro-switch D has a contact arm 120 which is arranged directly opposite an outwardly extending arm 121 mounted on the outer end of the plunger 93 of the solenoid 92 and with which arm the contact arm 120 cooperates.

Also, in the same circuit with the solenoid 107 and the micro-switch C, there is arranged a micro-switch E having a contact arm 113 which is disposed directly opposite the clutch pawl 114 of the clutch 48 on the shaft 47. One end of this clutch pawl 114 is pivotally attached, as at 115, to a plunger 116 of a solenoid 117 and is pivotally attached to bracket 118 intermediate its length, as at 119.

In the circuit between the micro-switch C and the micro-switch E, there is arranged also a double pole relay 122 with one of the contact arms 123 thereof bridging the line between the micro-switches C and E, as shown in Fig. 10. The other contact arm 124 of the relay bridges the line between a time delay relay 125 and the source of power. The time delay relay is also connected to the source of power and brush actuating solenoid 117.

The operation of the machine of the present invention will now be described.

Figure 6:
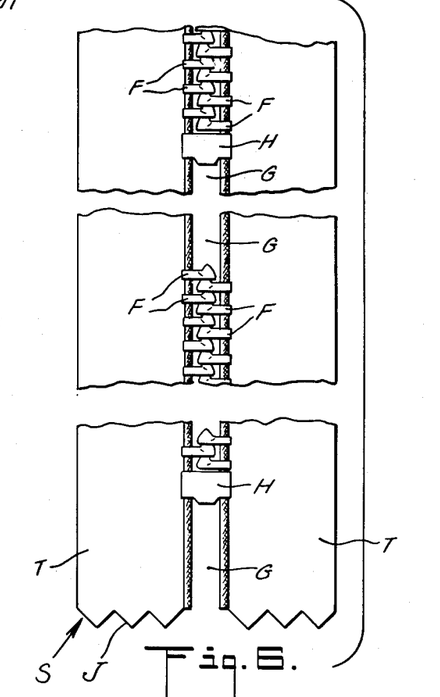
Fig. 6 is a plan view showing a continuous length fastener strip which the machine is adapted to cut.

The continuous fastener strip S which is adapted to be cut into individual fastener lengths by the machine consists of a pair of stringer tapes T having a series of fastener elements F arranged in groups along the opposed beaded edges thereof so as to provide blank or so-called "gap" spaces between each of the groups. The groups of one stringer are interengaged with those of the opposite stringer, as shown in Fig. 6, so as to provide a continuous strip or so-called "chain" having gap spaces G between each of the groups at which point the strip is to be cut. After the stringers are interengaged and before they are cut, it is preferable that bottom stops H be applied to the stringers at the end of each of the groups as shown, but it will be understood that it is not necessary that such stops be applied before cutting with the present machine.

It will be understood that the motor 50 is connected to a suitable source of power and it will be assumed that it is in operation. This motor drives continuously the main drive shaft 43 through the action of the reducer 51, the belt 52, and the chain 53. This main drive shaft 43 in turn drives continuously the shafts 15, 23, and 33 through the action of the chains 64 and 68. The shaft 43 also drives continuously the shaft 56a and the inner end of the shaft 47 through the action of beveled gears 55 and 56 and the chain 59.

After the machine has been set in operation, the end of the fastener strip S is fed into the guideway 7 and between the feed rolls 22 and 26. These feed rolls then feed the strip in under the head 9 and knife 10 and between the draw or delivery rolls 32 and 34. As the strip passes into and through the machine, both the fingers 81 and 102 which are located centrally of the strip and in the path of the fastener elements F will be depressed and forced downwardly out of the guideway by the depressing action of the fastener elements. When the strip has passed into the machine to such an extent that a gap space G is positioned opposite the finger 81, this finger will move upwardly into the guideway 7 and into the path of the fastener elements. As the strip continues to move into the machine and the fastener elements along the guideway, the bottom stop H or the endmost fastener element of a group will strike the finger 81 and move it forwardly or to the right thereby moving the member 83 about its pivotal connection at 84 and closing the micro-switch A. The closing of this switch energizes the brake solenoid 92 thereby actuating the brake 25 so as to arrest the rotatable movement of the shaft 23 together with the feed roll 22 carried thereby. This stops the movement of the strip momentarily and at this time the center of a gap space G should be disposed directly under the knife 10 with the strip in position to be cut.

When the brake solenoid 92 is actuated, the arm 121 carried by the plunger 93 thereof closes micro-switch D thereby closing one side of the circuit to the knife actuating solenoid 107. At this time, it will be seen that the finger 102 between the draw rolls 32 and 34 has been depressed by the fastener elements on the advanced group or length to be cut. The depressing action of this finger 102 closes micro-switch C and thereby completes the circuit to the knife actuating solenoid 107 thereby permitting it to be energized. The energization of the solenoid 107 permits the single revolution clutch 20 to function by moving the clutch pawl 110 out of engagement therewith. As a result, the shaft 15 is permitted to rotate one revolution. Upon rotation of this shaft, the head 9 together with the knife 10 is moved downwardly by the action of the cams 17 and the knife in cooperation with the anvil 8 cuts the tapes T centrally of the gap space, as at J, as shown in Fig. 6. After the cutting of the strip, the head together with the knife 10 is moved upwardly to its retracted position by the action of the flex plates 13. As the knife cuts and the head 9 moves downwardly, the lower end of the head strikes the upper end of the finger 81 thereby forcing it downwardly and releasing it thereby opening the micro-switch A, but the cam 101 on the shaft 15 closes the micro-switch B upon rotation of the shaft thereby maintaining the brake solenoid 92 energized until the cutting operation has been completed.

After the strip has been cut, the cut length passes between the draw rolls 32 and 34 and on to the conveyor belt 40. Generally, part of the cut length is disposed on the conveyor belt during the cutting operation depending on the length of the fastener. In fact, in most instances, the fastener is of such length that part of it is disposed on the conveyor belt during the cutting due to the close location of the end of the belt to the draw rolls and to the cutting knife. As the cut length passes between the draw rolls, the finger 102 will move out of contact with the fastener elements thereof upwardly to its normal position projecting into the guideway 7. The following group of fastener elements of the next length to be cut will almost immediately depress this finger 102 again as the strip is fed into the machine.

When the finger 102 moves upwardly, it will close the circuit through the double pole micro-switch C to the double pole relay 122 which in turn closes the circuit to the time delay relay 125. It will be understood that contact arm 123 of the relay 122 is provided to maintain the circuit closed through the micro-switch C, and the other contact arm 124 of this relay is provided to close the circuit to the time delay relay 125. The micro-switch C is both normally open and closed, i. e., when the finger 102 is up, the circuit is closed to the relay 122 and open to the solenoid 107, and when the finger is down, this switch is closed to the solenoid 107 and open to the relay 122. After a predetermined and set time, this time delay relay 125 closes the circuit to the brush solenoid 117 thereby energizing the same and moving the clutch pawl 114 about its pivotal connection at 119 and permitting the single revolution clutch 48 to function to rotate the shaft 47 together with the brushes 46 carried thereby one complete revolution. By this time, the cut fastener length or strip is completely disposed on the conveyor belt 40, and this rotatable action of the brushes 46 sweeps the cut strip therefrom into the receiving tray 45. Upon movement of the clutch pawl 114, the micro-switch E with which it cooperates is opened, this switch being normally closed, thereby opening the circuit to the relay 122.

After the shaft 15 has made one complete revolution and the micro-switch B is open, the solenoid 92 which is now de-energized permits the brake drum 95 to release thereby permiting the shaft 23 together with the feed roll 22 carried thereby to again rotate to feed the strip into the machine. As the strip again passes between the feed rolls 22 and 26, the fastener elements again depress the finger 81 and when the next gap space is disposed opposite the finger 81 the finger moves upwardly into the guideway 7 and the finger is tripped by the bottom stop or endmost fastener of a group, as before, and the cycle is repeated for each cutting operation. The operation is repeated over and over and the machine automatically adjusts itself to any length of fastener to be cut from the strip and various sizes of gap spacing between the groups of fastener elements.

It is preferable that the draw rolls 32 and 34 be driven at a slightly greater speed than the feed rolls 22 and 26 so as to maintain that portion of the strip between these two sets of rolls and in under the knife under tension during the cutting operation which obviously is desirable. It is also preferable that the conveyor belt 40 be driven at a greater speed than the draw rolls 32 and 34 so that the cut length will be quickly removed from the machine so as not to interfere with the leading end of the strip of the next length to be cut.

As a result of the present invention, it will be seen that a machine is provided which will operate continuously and automatically for the purpose desired. After the fastener strip is once placed in feeding position in the machine, it will be fed by the rolls 22 and 26 and the draw rolls 32 and 34 except when interrupted at intervals for the cutting operation. If any other interruption to the feed of the strip occurs, the friction clutch 24 which drives the feed rolls 22 and 26 and the slip clutch 70 which drives the draw rolls 32 and 34 will slip but will always be ready again to move the fastener strip when the resistance to movement is eliminated.

While I have shown and described an embodiment which my invention may assume in practice, it will be understood that this emobdiment is merely for the purpose of illustration and description, and that other forms may be devised within the scope of my invention as defined in the appended claims.

What I claim as my invention is:

1. A machine of the class described comprising a guideway for a continuous fastener strip which consists of spaced groups of interengaged fastener elements attached to the opposed edges of a pair of flexible tapes, means for conveying the fastener strip into and through said machine and along said guideway, a cutter positioned opposite said guideway, power means for actuating said cutter, means for controlling the actuation of said cutter in relation to the position of the strip in said guideway which includes a movable finger which normally projects into said guideway across the path of the fastener elements of the strip, said finger being movable out of its normal position when engaged by the end of each group of fastener elements, another movable finger arranged at a spaced distance from said first mentioned finger and forwardly thereof along said guideway which normally projects into the path of said fastener elements of the strip, said last mentioned finger being movable out of its normal position by the depressing action of said fastener elements, means responsive to the movement of said first-mentioned finger for arresting the action of said strip conveying means when the strip is to be cut, means responsive to movement of both of said fingers for actuating said power means to cut the strip, and means for delivering the cut strips from the guideway and from the machine.

2. A machine of the class described, as defined in claim 1, wherein the means responsive to movement of both of the movable fingers for actuating said power means to cut the strip consists of a solenoid which in turn controls the actuation of a single revolution clutch of said power means.

3. A machine of the class described, as defined in claim 1, wherein the means for delivering the cut strips from the guideway consists of a pair of opposed rolls between which the cut strips pass and a conveyor belt arranged therebeyond.

4. A machine of the class described, as defined in claim 3, including means for removing the cut strips from the conveyor belt and means for receiving the cut strips.

5. A machine of the class described comprising a guideway for a continuous fastener strip which consists of spaced groups of interengaged fastener elements attached to the opposed edges of a pair of flexible tapes, a knife for cutting the strip between each group of fastener elements, means for controlling the actuation of said knife, a pair of opposed rolls arranged to one side of said knife for engaging said strip to move it along said guideway, another opposed pair of rolls arranged on the opposite side of said knife for delivering the cut strip from said guideway, means for driving said rolls, a movable finger arranged adjacent said first pair of rolls and which normally projects into said guideway across the path of the fastener elements of the strip, said finger being movable out of its normal position when engaged by the end of each group of fastener elements, another movable finger arranged adjacent said second pair of rolls and which projects normally into the path of the fastener elements, said last mentioned finger being movable out of its normal position by the depressing action of said fastener elements, means responsive to the movement of said first-mentioned finger for arresting the action of said roll driving means and means responsive to the movement of both of said fingers for actuating said control means for actuating said knife.

6. A machine of the class described, as defined in claim 5, including a conveyor belt arranged beyond the second pair of opposed rolls for receiving and conveying the cut strips from said rolls and from the machine.

7. A machine of the class described, as defined in claim 6, including a rotatable brush arranged above said conveyor belt, means for controlling the actuation of said brush to remove the cut strips from said conveyor belt, the actuation of the knife, first mentioned pair of opposed rolls, and said brush all being in timed relation.

8. A machine of the class described, as defined in claim 7, wherein the means for controlling the actuation of the brush includes a relay switch and a solenoid to actuate said brush.

9. A machine of the class described, as defined in claim 7, wherein the means for controlling the actuation of the brush includes a relay switch, means responsive to the movement of the last mentioned finger for controlling said relay switch, a time delay relay switch controlled by said relay switch, and a solenoid energized by said time delay relay switch to actuate said brush.

10. A machine of the class described comprising a guideway for a continuous fastener strip which consists of spaced groups of interengaged fastener elements attached to the opposed edges of a pair of flexible tapes, feed mechanism for engaging said strip to move it along said guideway, a knife for cutting the strip between each group of fastener elements, a movable finger arranged on one side of said knife and projecting normally into the guideway and engageable with the end of each of said groups, another movable finger arranged on the opposite side of said knife forwardly of said first mentioned finger along said guideway and projecting normally into the path of the fastener elements, means responsive to the movement of both of said fingers for arresting the action of said feed mechanism and for actuating said knife in relation to the position of the strip in said guideway, and means for conveying the cut strips from said guideway and out of the machine.

11. A machine of the class described, as defined in claim 10, wherein the means for conveying the cut strip from the guideway and out of the machine includes a conveyor belt, a rotatable brush arranged above said belt for removing the cut strips therefrom, and means controlled by said second mentioned finger for controlling the actuation of said brush.

12. A machine of the class described, as defined in claim 11, wherein the means controlled by the second mentioned finger for controlling the actuation of the brush includes a relay switch and a solenoid energized thereby.

13. A machine of the class described, as defined in claim 10, wherein the means responsive to the movement of both of the fingers for actuating the knife includes a solenoid, a switch arranged with each of said fingers and in the same circuit with said solenoid whereby said solenoid is energized upon the movement of said fingers and the closing of said switches.

14. A machine of the class described, as defined in claim 11, wherein the means controlled by the second mentioned finger for controlling the actuation of the brush includes a solenoid and switch arranged with said second mentioned finger for controlling the energization of said solenoid.

15. A machine of the class described, as defined in claim 14, including a time delay relay switch for controlling the energization of said solenoid.

16. In a machine for cutting continuous fastener strip consisting of spaced groups of interengaged fastener elements attached to the opposed edges of a pair of flexible tapes, a guideway for said strip, means for moving and feeding the strip into and through said machine along said guideway, a cutting knife arranged adjacent said feeding means opposite said guideway, means for actuating said knife, an electrical circuit, means arranged in said circuit for controlling the actuation of said knife actuating means, means for controlling said last mentioned means including a movable member arranged forwardly of said knife actuated by said strip as it passes through the machine for controlling said last mentioned means and for arresting the action of said strip feeding means, and another means arranged in said circuit rearwardly of said knife responsive to the movement of the strip and fastener elements through the machine for controlling the actuation of said knife actuating means in co-operation with said movable member.

17. In a machine for cutting continuous fastener strip, the combination as defined in claim 16, including a conveyor belt arranged opposite the guideway and feeding means for receiving and delivering the cut strips from the machine, a brush arranged above said conveyor belt for removing the cut strips therefrom, means for actuating said brush intermittently, and means arranged in the electrical circuit for controlling the actuation of said last mentioned means.

18. In a machine for cutting continuous fastener strip consisting of spaced groups of interengaged fastener elements attached to the opposed edges of a pair of flexible tapes, a guideway for said strip, means for moving and feeding the strip into and through the machine along said guideway, a cutting knife arranged opposite said guideway adjacent said feeding means, means for actuating said knife intermittently, an electrical circuit, a solenoid arranged in said circuit for controlling said knife actuating means, means including a movable finger arranged forwardly of said knife projecting into said guideway and actuated by said strip as it passes along said guideway, said finger controlling the energization of said solenoid and the actuation of said strip feeding means, another movable finger arranged rearwardly of said knife extending into said guideway and controlled by the movement of said strip and fastener elements through the machine for controlling the energization of said solenoid in co-operation with said first mentioned movable finger.

19. In a machine for cutting continuous fastener strip, the combination as defined in claim 18, including a conveyor belt arranged opposite the guideway and feeding means for receiving and delivering the cut strips from the machine, a brush arranged above said conveyor belt for removing the cut strips therefrom, means for actuating said brush intermittently, and another solenoid arranged in the electrical circuit for controlling the actuation of said brush.

20. In a machine of the class described, a guideway for a continuous length fastener strip which consists of spaced groups of interengaged fastener elements attached to the opposed edges of a pair of flexible stringer tapes, a reciprocable knife arranged opposite said guideway for cutting the strip between each group of fastener elements, a pair of guide and feed rolls arranged forwardly of said knife for engaging said strip to move it along said guideway, means for driving said guide and feed rolls, an electrical circuit, a solenoid arranged in said circuit for arresting the actuation of said guide and feed roll driving means, means for actuating said knife, another solenoid arranged in said circuit for controlling the actuation of said knife actuating means, a pair of movable finger-like members with one arranged forwardly of said knife adjacent said pair of guide and feed rolls and with the other arranged rearwardly thereof both of which normally project into said guideway into the path of the fastener elements of said strip, switch mechanism arranged in said circuit for controlling the energization of both of said solenoids, said movable finger-like members being movable out of their normal position when engaged by the fastener elements when the strip is moved along said guideway so as to actuate said switch mechanism, and means arranged rearwardly of said knife for conveying the cut strips from said guideway and out of the machine.

21. In a machine of the class described, the combination as defined in claim 20, wherein the means arranged rearwardly of the knife for conveying the cut strips from the guideway and out of the machine consists of a pair of opposed delivery rolls, a conveyor belt arranged beyond said pair of delivery rolls, brush-like means arranged above said conveyor belt for movement transversely thereof for removing the cut fastener lengths therefrom, means for actuating said brush-like means, and a solenoid arranged in the electrical circuit for controlling the actuation of said brush-like means, said switch mechanism adapted to control the energization of said solenoid.

22. In a machine of the class described, a guideway for a continuous length fastener strip which consists of spaced groups of interengaged fastener elements attached to the opposed edges of a pair of flexible stringer tapes, a reciprocable knife arranged opposite said guideway for cutting the strip between each group of fastener elements, a pair of guide and feed rolls arranged forwardly of said knife for engaging said strip to move it along said guideway, means for actuating said knife including a single revolution clutch, a solenoid for controlling the actuation of said clutch, a movable finger-like member arranged adjacent said pair of rolls which normally projects into said guideway into the path of the fastener elements of said strip, an electrical circuit having a switch arranged therein for controlling the actuation of said solenoid, said movable finger-like member being movable out of its normal position when engaged by the fastener elements when the strip is moved along said guideway so as to actuate said switch, and another pair of delivery rolls arranged rearwardly of said knife for delivering the cut fastener lengths from said guideway.

23. In a machine of the class described, the combination as defined in claim 22, including means for driving the pair of guide and feed rolls, and a solenoid arranged in the electrical circuit for controlling said driving means and arresting the movement of the same so that the gaps between the groups of fastener elements are momentarily brought to rest directly opposite said knife, said solenoid being controlled by said switch.

24. In a machine of the class described, the combination as defined in claim 22, including another movable finger-like member arranged adjacent said delivery rolls rearwardly of said knife which projects normally into the path of the fastener elements and which is movable out of its normal position by the depressing action of the fastener elements as they pass therealong, a switch arranged in said electrical circuit which in co-operation with said first mentioned switch controls the actuation of said knife solenoid, said last mentioned switch adapted to be controlled by said last mentioned finger-like member.

25. In a machine of the class described, the combination as defined in claim 22, including a conveyor belt arranged rearwardly of said pair of delivery rolls for receiving cut fastener lengths from said delivery rolls, brush-like means arranged above said conveyor belt for movement transversely thereof for removing the cut fastener lengths therefrom, means for actuating said brush-like means including a single revolution clutch, a solenoid for actuating said clutch, and a switch arranged in said electrical circuit for controlling the actuation of said solenoid.

References Cited in the file of this patent

UNITED STATES PATENTS

| | | |
|---|---|---|
| 463,861 | Gilliland | Nov. 24, 1891 |
| 482,917 | Dix | Sept. 20, 1892 |
| 695,553 | Heany | Mar. 18, 1902 |
| 1,128,518 | Rohland | Feb. 16, 1915 |
| 1,318,320 | Frohn | Oct. 7, 1919 |
| 1,837,762 | Dale | Dec. 22, 1931 |
| 1,958,132 | Davis | May 8, 1934 |
| 2,170,609 | Nedal | Aug. 22, 1939 |
| 2,318,508 | Martindell | May 4, 1943 |